(12) United States Patent
Shirosaki et al.

(10) Patent No.: US 11,408,488 B2
(45) Date of Patent: Aug. 9, 2022

(54) TWO-STAGE TRANSMISSION FOR ELECTRICALLY DRIVEN VEHICLE

(71) Applicant: UNIPRES CORPORATION, Yokohama (JP)

(72) Inventors: Ryo Shirosaki, Fuji (JP); Ryosuke Suzuki, Fuji (JP); Hideyuki Nezu, Fuji (JP); Yuta Oono, Fuji (JP); Kentaro Furukawa, Fuji (JP)

(73) Assignee: UNIPRES CORPORATION, Yokohama (JP)

( * ) Notice: Subject to any disclaimer, the term of this patent is extended or adjusted under 35 U.S.C. 154(b) by 0 days.

(21) Appl. No.: 17/420,175

(22) PCT Filed: Jun. 26, 2020

(86) PCT No.: PCT/JP2020/025233
§ 371 (c)(1),
(2) Date: Jul. 1, 2021

(87) PCT Pub. No.: WO2021/010138
PCT Pub. Date: Jan. 21, 2021

(65) Prior Publication Data
US 2022/0128129 A1 Apr. 28, 2022

(30) Foreign Application Priority Data

Jul. 12, 2019 (JP) .............................. JP2019-130088

(51) Int. Cl.
*F16H 3/54* (2006.01)
*F16D 21/00* (2006.01)

(52) U.S. Cl.
CPC ............... *F16H 3/54* (2013.01); *F16D 21/00* (2013.01); *F16H 2200/0021* (2013.01);
(Continued)

(58) Field of Classification Search
None
See application file for complete search history.

(56) References Cited

U.S. PATENT DOCUMENTS 5,273,500 A * 12/1993 Nagano .................. F16H 3/663
192/217.4

FOREIGN PATENT DOCUMENTS

JP 2006-234062 A 9/2006
JP 2013-133841 A 7/2013
(Continued)

OTHER PUBLICATIONS

International Search Report with English translation and Written Opinion issued in corresponding application No. PCT/JP2020/025233 dated Sep. 8, 2020.

*Primary Examiner* — Colby M Hansen
(74) *Attorney, Agent, or Firm* — Foley & Lardner LLP

(57) ABSTRACT

The present invention relates to a two-stage transmission for an electrically driven vehicle including a dog clutch and a friction clutch, and an object of the present invention is to prevent a torque drop when shifting gears. The two-stage transmission for the electrically driven vehicle includes a planetary gear mechanism (12), a dog clutch (28), a friction clutch (30), an armature (26) to switch between the dog clutch (28) and the friction clutch (30), and an electromagnetic coil (31) to drive the armature (26). In the dog clutch (28) and the friction clutch (30), the coupling relationship among the rotational elements of the planetary gear mechanism (12) is set such that the dog clutch (28) is fastened and the friction clutch (30) is not fastened in speed reduction (the first speed), and the dog clutch (28) is not fastened and the friction clutch (30) is fastened in speed increase (the second speed). To prevent the torque drop when shifting the gears, a ratchet-type one-way clutch (50) is disposed such that a rotational phase position of the ratchet-type one-way clutch (Continued)

(50) is coincident with that of the dog clutch (28). When shifting from the second speed to the first speed, since the rotational phase of the dog clutch (28) is adjusted by the ratchet-type one-way clutch (50), the shifting is instantaneously completed without waiting operation for the phase adjustment, resulting in preventing a transmission shock.

3 Claims, 9 Drawing Sheets

(52) U.S. Cl.
CPC ............... *F16H 2200/0034* (2013.01); *F16H 2200/2005* (2013.01); *F16H 2200/2033* (2013.01); *F16H 2200/2064* (2013.01); *F16H 2200/2066* (2013.01); *F16H 2200/2082* (2013.01); *F16H 2200/2094* (2013.01); *F16H 2200/2097* (2013.01)

(56) References Cited

FOREIGN PATENT DOCUMENTS

| | | |
|---|---|---|
| JP | 2016-017632 A | 2/2016 |
| JP | 2016-109146 A | 6/2016 |

\* cited by examiner

TWO-STAGE TRANSMISSION FOR ELECTRICALLY DRIVEN VEHICLE

TECHNICAL FIELD

The present invention relates to a two-stage transmission for an electrically driven vehicle such as an electric vehicle (EV) and a hybrid vehicle.

BACKGROUND ART

In an electric vehicle (EV) whose power is obtained from an electric motor, such as a hybrid vehicle whose power is obtained from switching between an engine and the electric motor and a vehicle which is run by only the driving power from the electric motor, a power transmission from the electric motor to an axle side is normally performed by providing with only a speed reducer in which a rotational number of the electric motor is reduced to that of the axle whose value is appropriate for running, without providing with another transmission. This is because the electric motor enables to generate a driving torque from a low rotational number range, have a wide rotational range which can be used for running and have a simple structure which is an important sales point of the electric vehicle (EV).

However, even in the electric vehicle (EV), it has a merit to use the transmission. It is difficult for even the electric motor to keep a high efficiency over an overall vehicle speed range. Specifically, since the rotational number of the electric motor is higher in the high vehicle speed driving range of the vehicle, the efficiency of the electric motor is decreased. As an improvement plan, a two-stage transmission is disposed between the electric motor and the speed reducer, a low reduction ratio side in the two-stage transmission is used in the high vehicle speed driving range of the vehicle, and the high vehicle speed driving in the vehicle can be performed by using the lowered rotational number of the electric motor, resulting in expanding the using range in which the electric motor drives with a high efficiency. As such a two-stage transmission, Patent Document 1 proposes the transmission having a planetary gear mechanism for performing the two-stage transmission. The planetary gear mechanism includes three rotational elements and the three rotational elements are a carrier which pivotally supports plural pinions, a sun gear and a ring gear. When the vehicle runs at the low vehicle speed driving range, a friction clutch is not engaged when a dog clutch is engaged, and the ring gear is fixed to the housing by the dog clutch engagement. In this time, the rotation of the input axis is outputted from the sun gear via the carrier and the transmission ratio becomes larger than 1.0 (speed reduction) When the vehicle runs at the high vehicle speed driving range, the friction clutch is engaged when the dog clutch is not engaged, the ring gear is released from the housing and integrally rotates with the sun gear and the carrier, and the transmission ratio becomes 1.0 (uniform speed (uniform motion)). The gear ratio in the high vehicle speed driving range is set to be lower than that in the low vehicle speed driving range, resulting in relatively decreasing the rotational number of the electric motor in the high vehicle speed driving range. Accordingly, the high efficient driving range of the electric motor can be expanded in the higher vehicle speed driving range and the high vehicle speed driving is performed with a high efficiency.

THE LIST OF PRIOR ART DOCUMENTS

Patent Documents

Patent Document 1: Japanese Unexamined Patent Publication No. 2016-017632 A

SUMMARY OF THE INVENTION

Problems to be Solved by the Invention

In the technique of Patent Document 1 in which the dog clutch is engaged and the friction clutch is not engaged (the first speed is selected) in the low vehicle speed driving and the dog clutch is not engaged and the friction clutch is engaged (the second speed is selected) in the high vehicle speed driving, since both the dog clutch and the friction clutch are not simultaneously engaged when shifting between the first speed and the second speed, it is unavoidable that a state that the dog clutch and the friction clutch are not engaged when shifting between the first speed and the second speed is existed in a moment. In the above case, because the output axis is separated from the electric motor, a torque drop is occurred and a shifting shock is transmitted to the driver.

In a case of shifting from the second speed to the first speed (speed reduction), considering the structure of the dog clutch, since the clutch engagement is performed in accordance with the relative rotation of the engaged gear surface while the dog clutch is transited from a non-engagement state to an engagement state, this also causes the transmission shock.

The present invention has been developed in view of the above-described problems of the prior art, and an object of the present invention is to reduce the transmission shock in the two-stage transmission in which the dog clutch is engaged and the friction clutch is not engaged (the first speed is selected) in the low vehicle speed driving and the dog clutch is not engaged and the friction clutch is engaged (the second speed is selected) in the high vehicle speed driving.

Means for Solving the Problems

The present invention relates to a two-stage transmission that is disposed along an output axis of an electric motor in a vehicle using the electric motor for wheel driving, comprising: a planetary gear mechanism which comprises three rotational elements including a carrier pivotally supporting plural pinions and plural gears which have a different tooth number and engage with the pinions, and uses a first speed mode in which a first rotational element selected from the three rotational elements is fixed to a housing side and power transmission is performed by using a gear ratio whose value is different from 1.0 and which is obtained between a second rotational element and a third rotational element, and a second speed mode in which the power transmission is performed by using the gear ratio whose value is 1.0 and which is obtained by inputting from and outputting to one of the second rotational element and the third rotational element, or by integrally rotating one of the second rotational element and the third rotational element with the first rotational element; a dog clutch which couples with the rotational elements of the planetary gear mechanism to select a relatively low gear ratio side speed mode between the first speed mode and the second speed mode; a friction clutch which couples with the rotational elements of the planetary gear mechanism to select a relatively high gear ratio side speed mode between the first speed mode and the second speed mode; and a ratchet-type one-way clutch to prevent a torque drop when shifting between the first speed mode and the second speed mode, wherein engagement portions of the dog clutch and a ratchet engagement portions of the ratchet-type one-way clutch are arranged at the same rotational phase position.

As a preferable embodiment, in the two-stage transmission, the first speed mode whose reduction side gear ratio is larger than 1.0 is selected by the dog clutch as the relatively low gear ratio side speed mode, and the second speed mode whose gear ratio is 1.0 is selected by the friction clutch as the relatively high gear ratio side speed mode. In one aspect of the preferable embodiment, the first rotational element selected from the three rotational elements of the planetary gear mechanism is permanently fixed to the housing side, the reduction side gear ratio whose value is larger than 1.0 is obtained between the second rotational element and the third rotational element by using the dog clutch as the first speed mode of the low gear ratio side, and the gear ratio whose value is 1.0 is obtained by inputting from and outputting to one of the second rotational element and the third rotational element of the planetary gear mechanism by using the friction clutch as the second speed mode of the high gear ratio side. The one-way clutch for preventing the torque drop operates such that the second rotational element or the third rotational element is locked to the input axis side when shifting between the first speed mode and the second speed mode. In another aspect of the above preferred embodiment, the first rotational element in the three rotational elements of the planetary gear mechanism is selectively fixed to the housing side, the reduction side gear ratio whose value is larger than 1.0 is obtained between the second rotational element and the third rotational element by using the dog clutch as the first speed mode of the low gear ratio side, and the gear ratio whose value is 1.0 is obtained by releasing the first rotational element from the fixing to the housing side and integrally rotating one of the second rotational element and the third rotational element with the first rotational element (consequently, the three rotational elements integrally rotate) by using the friction clutch as the second speed mode of the high gear ratio side. The one-way clutch for preventing the torque drop operates such that the power transmission from the input side to the output side is surely performed by locking the first rotational element to the housing side.

Effects of the Invention

In an intermediate state that the dog clutch and the friction clutch are not engaged when shifting between the first speed mode and the second speed mode, by disposing the one-way clutch, the instantaneous rotation drop in the output side and the transmission shock can be prevented. By using the ratchet-type one-way clutch, the dog clutch can instantaneously become the engagement state when switching from the friction clutch to the dog clutch (speed reduction). In the normal engagement operation of the dog clutch, the waiting operation for completing the engagement is needed. In a case of using the one-way clutch, since this waiting operation is not needed, further reduction of the transmission shock can be realized.

MODE FOR CARRYING OUT THE INVENTION

Figure 1:
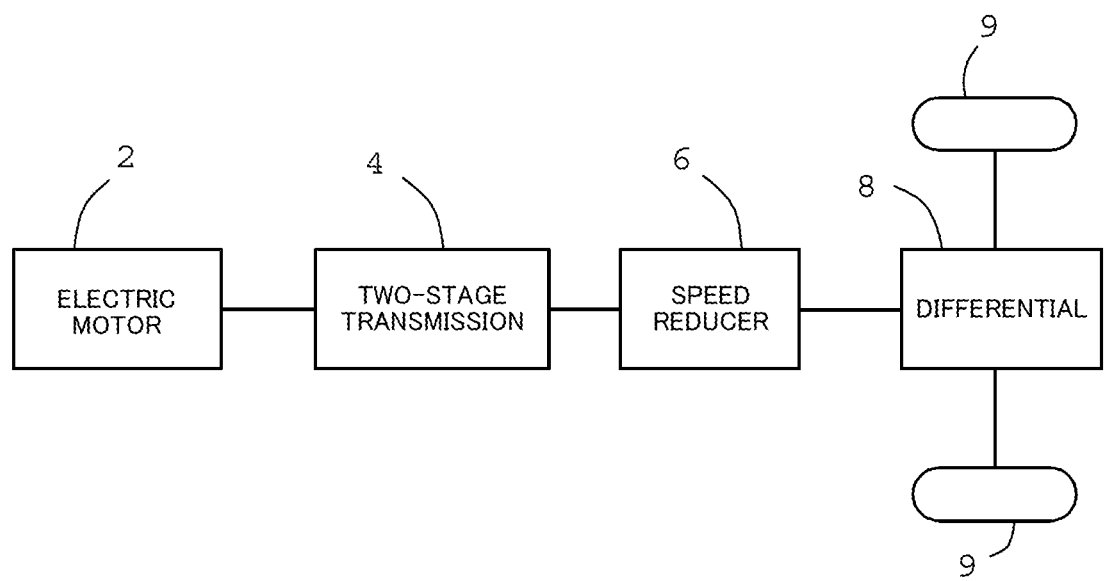
FIG. 1 is a schematic view showing a wheel driving train of an electric vehicle, which is used in an electrically driven vehicle of the present invention.

FIG. 1 is a schematic view showing a wheel driving train of an electric vehicle, which is used in a two-stage transmission for an electrically driven vehicle of the first embodiment according to the present invention. Reference numerals 2, 4, 6, 8 and 9 indicate an electric motor for running, a two-stage transmission, a speed reducer, a differential and wheels, respectively. The speed reducer 6 and gears which are engaged with the speed reducer 6 are received in a casing and the speed reducer 6 is disposed for reducing high rotational number in the electric motor 2 to the rotational number appropriate for the running by the wheels 9. In a case of the normal electric vehicle which does not include the two-stage transmission 4, a value of the reduction ratio in the speed reducer 6 is set to about eight. In normally used low vehicle speed driving, this value is suitable for operating the electric motor 2 in a high efficient rotational number range. However, in a case that this setting is used in high vehicle speed driving, the efficiency is decreased because the rotational number of the electric motor 2 is too high. Thus, the two-stage transmission 4 is disposed for realizing the high vehicle speed driving with a high efficiency. In the first embodiment described below, the reduction ratio of the first speed stage is set to 2.4 and the reduction ratio of the second speed stage is set to 1.0 (direct connection). In a case that the reduction ratio of the speed reducer 6 is set to 3.41, the total reduction ratio using the first speed stage is 8.18 (=2.4× 3.41). This value is almost the same as the total reduction ratio in a case of the conventional apparatus which does not include the two-stage transmission. In a case that the second speed stage is used in the driving mode, the total reduction ratio is 3.41 (=1.0×3.41). Since the total reduction ratio becomes smaller in the high vehicle speed driving range, the driving motor 2 enables to drive in the highly efficient low rotation range in comparison with the conventional apparatus, resulting in realizing the high vehicle speed with high efficiency.

Figure 2:
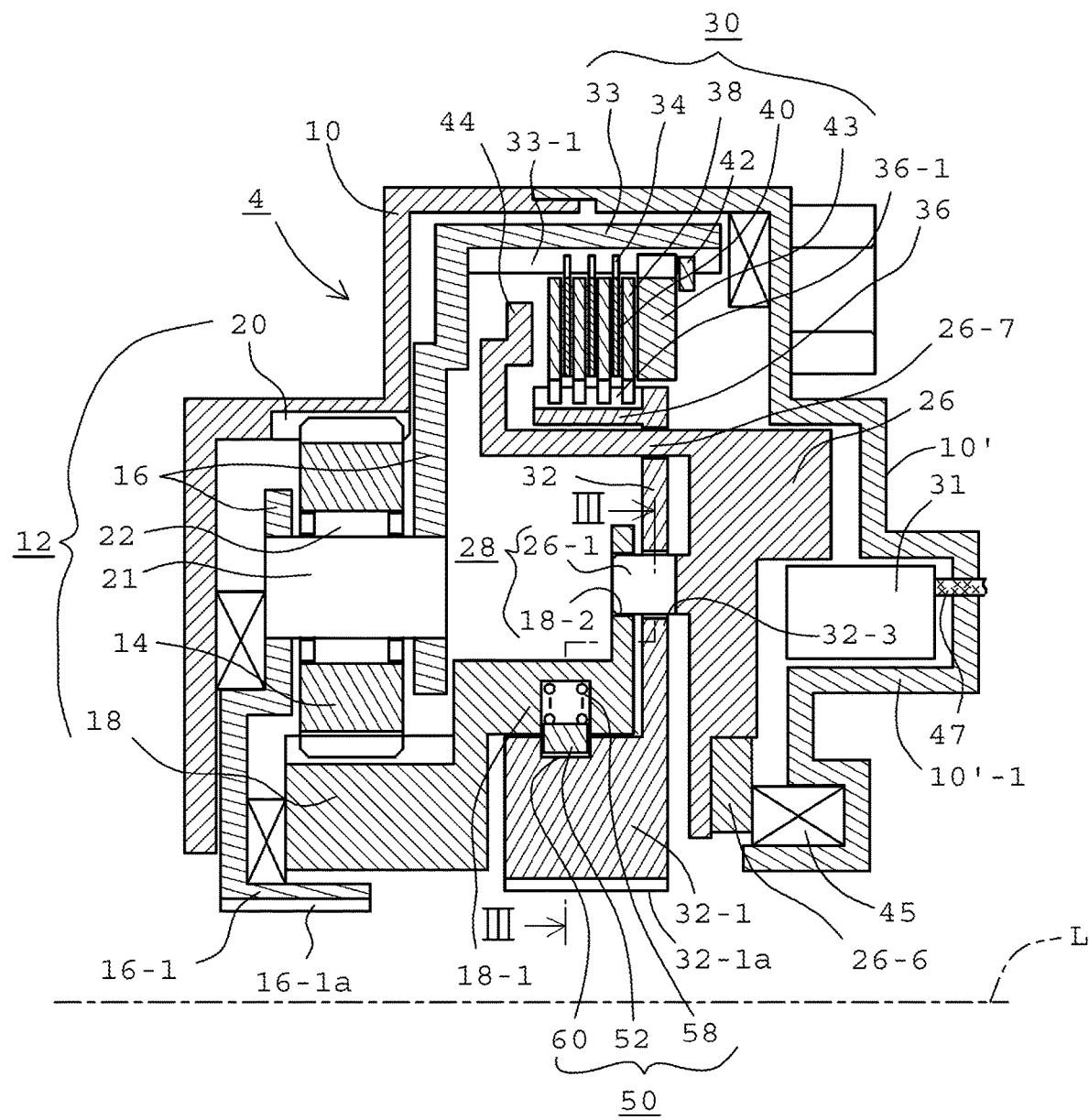
FIG. 2 is a cross-sectional view of an upper portion along a central axis of a two-stage transmission of the first embodiment according to the present invention and shows a state that a dog clutch is an engagement state and a friction clutch is a non-engagement state.

FIG. 2 is a cross-sectional view of the two-stage transmission for the electric vehicle of the first embodiment according to the present invention and the upper portion of the two-stage transmission above a central line L is depicted in FIG. 2. The reference numeral 10 indicates a housing and a closed cavity portion, which receives a main portion of the two-stage transmission 4 of the present invention and stores lubricant oil for lubricating engaging portions of the gears, is formed by the housing 10 and a separated cover 10' which is welded to the housing 10. The planetary gear mechanism 12 is disposed in the housing 10 and comprises three rotational elements including a carrier 16 which rotatably and pivotally supports plural pinions 14 disposed in a circumferential direction with a space and is sandwiched between the pinions 14, a sun gear 18 whose rotational center is in common with that of the carrier 16 and which is engaged with the pinions 14 at an inside surface, and a ring gear 20 whose rotational center is in common with that of the carrier 16 and which is engaged with the pinions 14 at an outside surface and is configured as inner circumferential gears of the housing 10. Pins 21, which are fixed to the carrier 16, pivotally support the corresponding pinions 14 to the carrier 16. The reference numeral 22 indicates a needle bearing.

The two-stage transmission includes an armature 26, a dog clutch 28, a multi-plate friction clutch 30 (hereinafter, referred to as "a friction clutch 30"), an electromagnetic coil 31 which serves as a driving power source for performing a seesaw switching operation between the dog clutch 28 and the friction clutch 30 in one motion, and a support plate 32 to movably support the armature 26, which is used for the seesaw switching operation between the dog clutch 28 and the friction clutch 30, in a fore-aft axial direction. The support plate 32 serves as a support portion of a clutch pack of the friction clutch 30 and also has a function that rotational motion received from the electric motor 2 (FIG. 1) is transferred to the planetary gear mechanism 12 via the dog clutch 28 or the friction clutch 30. To achieve the above power transferring function, the support plate 32 forms a spline 32-1a on an inner circumferential surface of a boss portion 32-1, the boss portion 32-1 is spline-engaged with an output axis (not shown) of the electric motor 2, and the support plate always integrally rotates with the output axis of the electric motor 2. The dog clutch 28 includes eight fastening units (see, FIG. 3) which are disposed in a circumferential direction with an equal interval.

In the first embodiment, since the ring gear 20 of the planetary gear mechanism 12 is integrated with the housing 10, the ring gear 20 is always fixed to the housing 10. When the sun gear 18 is coupled with the input axis from the electric motor 2 (FIG. 1) via the dog clutch 28 described below and the friction clutch 30 is not engaged, the rotational speed obtained from the carrier 16 which is disposed at the output side is reduced. When the friction clutch 30 is engaged and the dog clutch 28 is not engaged, the rotation is inputted to and is outputted from the carrier 16 (the gear ratio is 1.0) and the rotational speed obtained from the carrier 16 is relatively increased. The carrier 16 includes the spline 16-1a on the inner surface of the boss portion 16-1. The input axis (not shown) of the speed reducer 6 (FIG. 1) is spline-engaged with the spline 16-1a, resulting in transferring the driving power to the wheels 9 (FIG. 1) via the speed reducer 6.

The armature 26 includes plural clutch projections 26-1 (eight clutch projections are existed in the first embodiment (FIG. 3)) which are equally spaced in a circumferential direction at an intermediate portion in a radial direction. The clutch projections 26-1 serve as a male portion of the respective units in the dog clutch 28. The armature 26 also includes a driving portion 44 of the friction clutch 30 in an outer circumferential portion.

The sun gear 18 of the planetary gear mechanism 12 includes a cylindrical extending portion 18-1 which is extended to the armature 26 side. Clutch holes 18-2 (eight clutch holes are existed in the first embodiment (FIG. 3)) which are the same number of the clutch projections 26-1 are formed on an armature side flange end portion of this cylindrical extending portion 18-1, and the clutch holes 18-2 are smoothly disengageable to the corresponding clutch projections 26-1 of the armature 26 in an axial direction without looseness. The clutch holes 18-2 serve as a female portion of the respective units in the dog clutch 28. In other words, the eight fastening units of the dog clutch 28 of the first embodiment shown in FIGS. 3 and 7 include the clutch projection 26-1 at the armature 26 side and the clutch hole 18-2 at the sun gear 18 side.

In FIG. 2, the friction clutch 30 includes an outer cylinder 33 arranged in the housing 10, driven plates 34 which are disposed in sliding grooves 33-1 of the outer cylinder 33 and are slidable in an axial direction, an inner cylinder 36, driving plates 38 which are disposed in sliding grooves 36-1 of the inner cylinder 36 and slidable in an axial direction, clutch facings 40 which are fixed on both surfaces of the driven plates 34, a pressure receiving plate 43 which is disposed on the sliding groove 33-1 of the outer cylinder 33, is slidable in an axial direction and is stopped in an engaged state by a snap ring 42, and a friction clutch driving portion 44 which is integrated with the armature 26 and is opposite to the pressure receiving plate 43. A clutch pack is sandwiched between the friction clutch driving portion 44 and the pressure receiving plate 43. The friction clutch driving portion 44 sandwiches the clutch pack which includes the driven plates 34, the driving plates 38 and the clutch facings 40, and is opposite to the pressure receiving plate 43. The engagement and the disengagement of the friction clutch 30 are performed by the friction clutch driving portion 44 under the axial direction movement of the armature 26. The friction clutch driving portion 44 integrally rotates with the armature 26 and a support plate 32. In FIG. 2, an extending portion 26-7 which extends from the armature 26 to the planetary gear mechanism is fit into and is inserted into the support plate 32, and the friction clutch driving portion 44 extends from an end of the extending portion 26-7 to a radial outer circumferential direction.

The inner cylinder 36 of the friction clutch 30 is configured to be as a cylindrical portion which extends from the support plate 32 to the planetary gear mechanism 12, and integrally rotates with the support plate 32 and the armature 26. On the other hand, as described above, the support plate 32 is coupled with the input axis from the electric motor 2, and the inner cylinder 36 of the friction clutch 30, which integrally rotates with the support plate 32, also integrally rotates with the input axis. The outer cylinder 33 of the friction clutch 30 is coupled with and integrally rotates with the carrier 16.

The armature 26 is assembled to pivotally support the support plate 32 in an axial direction and not to rotate around the support plate 32 in a circumferential direction. That is, in the first embodiment shown in FIG. 3, the eight clutch projections 26-1 of the armature 26 side, which are included in the dog clutch 28, are engaged with the corresponding clutch holes 18-2 of the support plate 32 side, resulting in realizing the support structure in which the armature 26 pivotally supports the support plate 32 in an axial direction and does not rotate around the support plate 32 in a circumferential direction.

Figure 6:
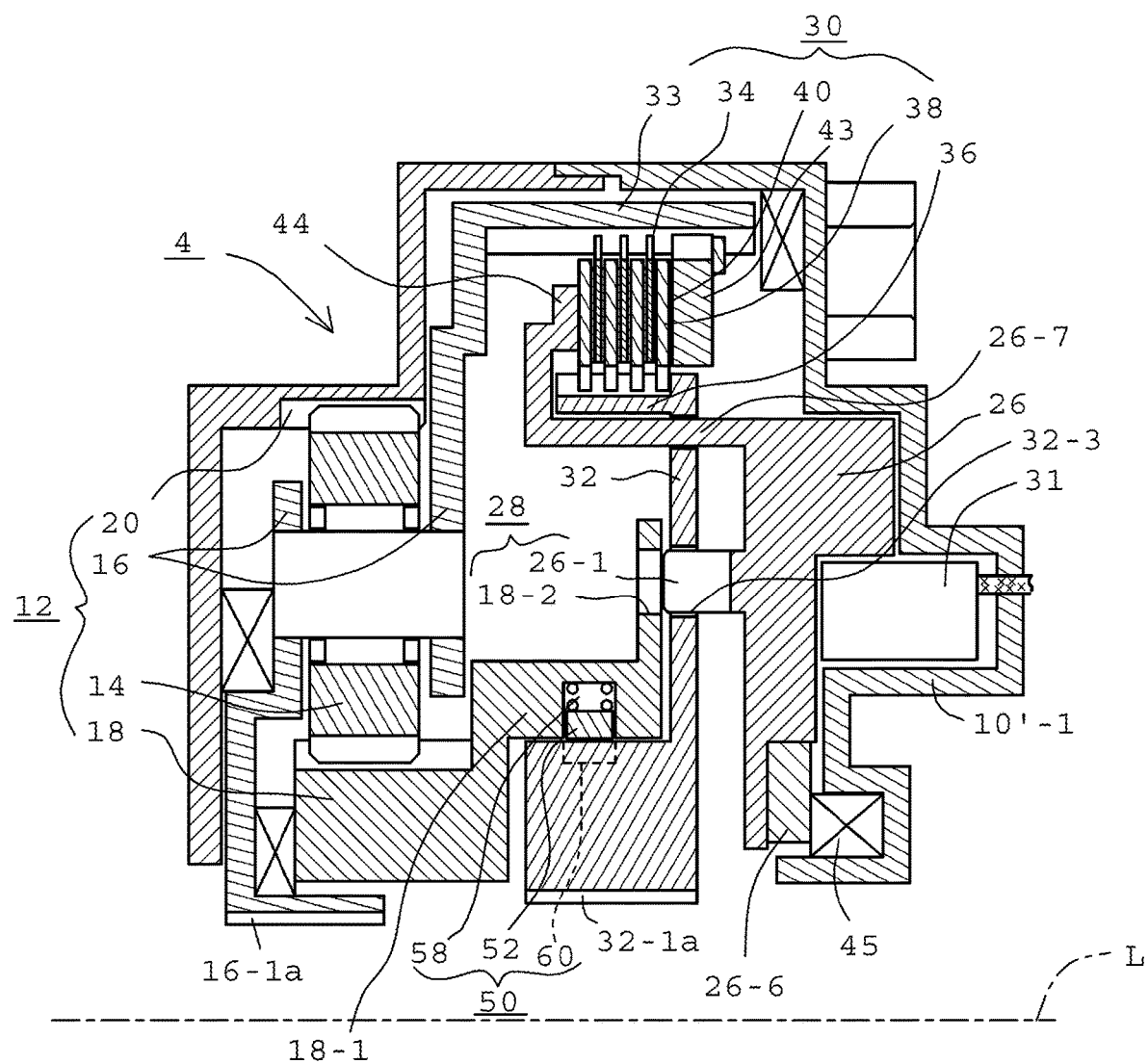
FIG. 6 is a cross-sectional view of the upper portion along the central axis of the two-stage transmission of the first embodiment according to the present invention as well as FIG. 2 and shows a state that the dog clutch is the non-engagement state and the friction clutch is the engagement state.

The electromagnetic coil 31 of the armature 26 is separately opposite to the planetary gear mechanism 12 and is received in an electromagnetic coil receiving portion 10'-1 formed in the cover 10'. The reference numeral 47 indicates a harness for energizing and controlling the electromagnetic coil 31. Plural return springs 45 such as coil springs are disposed with a space in a circumferential direction. In a case that the electromagnetic coil 31 is not energized, the return springs 45 bias the armature 26 to the left direction in FIG. 2, the clutch projections 26-1 of the armature 26 side and the clutch holes 18-2 of the sun gear 18 side are engaged shown in FIG. 2, the dog clutch 28 becomes the fastening state, the friction clutch driving portion 44 which integrates with the armature 26 is spaced from the clutch pack, and the friction clutch 30 becomes the non-fastening state. On the other hand, when the electromagnetic coil 31 is energized, magnetic flux is generated from the electromagnetic coil 31 to the armature 26, as shown in FIG. 6, the armature 26 moves to the right direction in FIG. 2 against the return springs 45, the clutch projections 26-1 are disengaged from the clutch holes 18-2, and the dog clutch 28 becomes the non-fastening state. By the right direction movement of the armature 26, the clutch pack is sandwiched between the friction clutch driving portion 44 and the pressure receiving plate 43, and the friction clutch 30 becomes the fastening state. When the energization of the electromagnetic coil 31 is stopped, the armature 26 moves the left direction by the return springs 45, as shown in FIG. 2, the friction clutch 30 becomes the non-fastening state and the dog clutch 28 becomes the fastening state.

As described above, the seesaw switching operation in which the friction clutch 30 becomes the non-fastening state when the dog clutch 28 becomes the fastening state and the dog clutch 28 becomes the non-fastening state when the friction clutch 30 becomes the fastening state, is performed by the left and right direction movements along the rotational axis of the armature 26. It is necessary that the dog clutch 28 and the friction clutch 30 are simultaneously fastened. Considering the required tolerance, when switching between the dog clutch 28 and the friction clutch 30, a state that the output side is separated from the input side, which is so-called as the torque drop, is instantaneously occurred, and this causes the transmission shock which the driver feels. In the first embodiment of the present invention, for preventing the torque drop, the ratchet-type one-way clutch 50 in which the sun gear 18 of the planetary gear mechanism 12 locks to the input axis side, is disposed.

Figure 3:
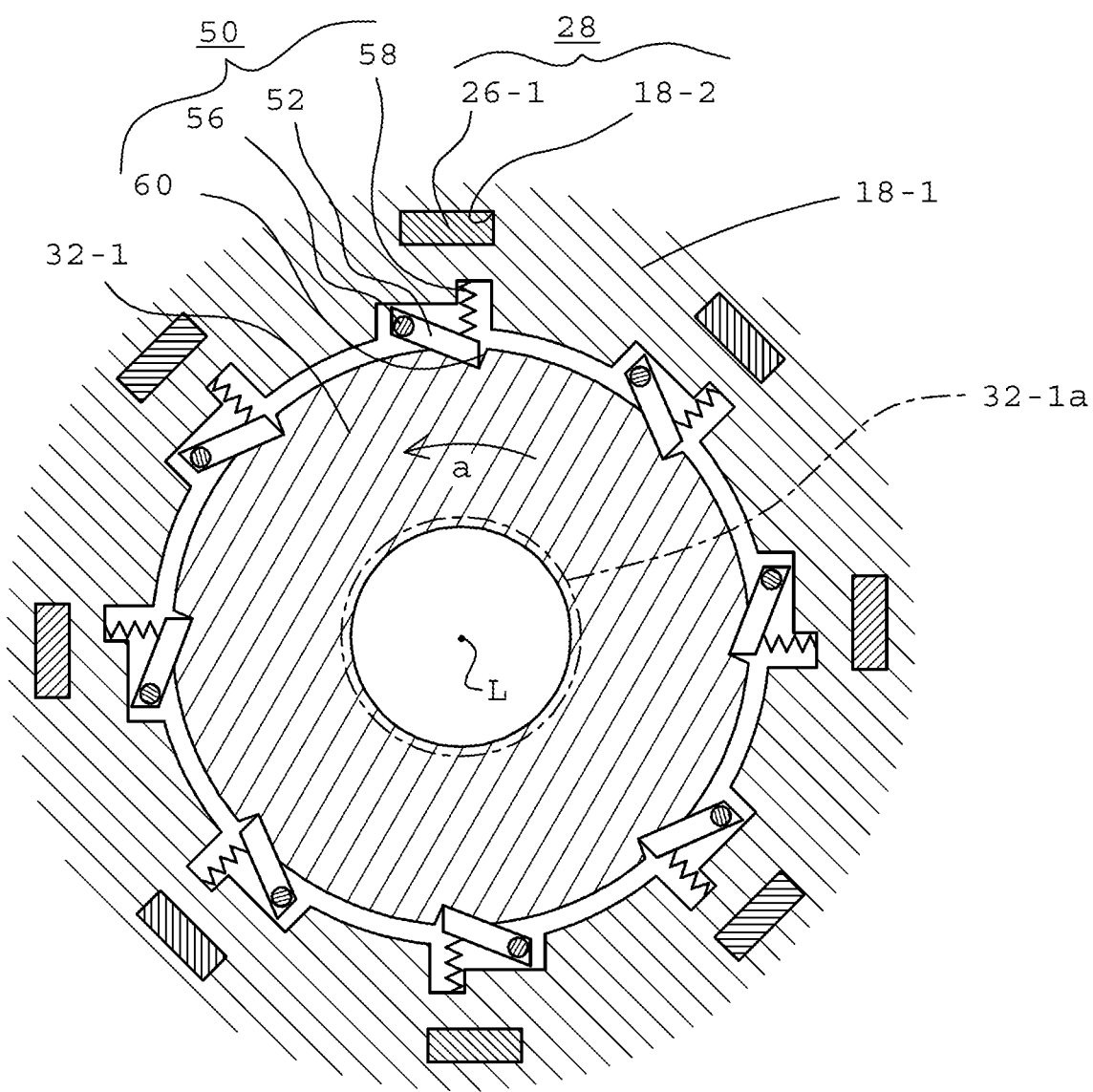
FIG. 3 is a cross-sectional view substantially taken along a III-III line in FIG. 2.

As shown in FIGS. 2 and 6, in the first embodiment, the ratchet-type one-way clutch 50 is disposed between the cylindrical extending portion 18-1 of the sun gear 18 and the boss portion 32-1 of the support plate 32. As is well known, the ratchet-type one-way clutch which is commercially available includes a unit including an inner race and an outer race. However, in the present invention, since a detailed structure of the ratchet-type one-way clutch 50 is not directly related to the essential of the invention, for simplifying the explanation, the principal structure of the ratchet-type one-way clutch 50 which is disposed between the cylindrical extending portion 18-1 and the boss portion 32-1 is depicted in FIG. 3. The ratchet-type one-way clutch 50 of the first embodiment includes eight fastening units (FIG. 3) which are the same number of the clutch units of the dog clutch 28 and are disposed in a circumferential direction with an equal interval. As shown in an enlarged view of FIG. 4, each of the fastening units of the one-way clutch 50 includes a ratchet craw 52; a ratchet craw receiving portion 54 which is formed as an inner circumferential recess of the cylindrical extending portion 18-1 disposed at an outer circumferential side and receives the ratchet craw 52; a support pin (a pivot pin) 56 which pivotably supports the ratchet craw 52, which is retractable from the ratchet craw receiving portion 54 to the inner circumferential surface of the cylindrical extending portion 18-1, about an axis parallel to the rotational axis "L" (FIG. 2); a spring 58 such as a coil spring which pivots and biases the ratchet craw 52 such that the ratchet craw 52 is projected from the ratchet craw receiving portion 54; and a locking groove 60 which is formed on the boss portion 32-1 of the support plate 32, is opposite to the ratchet craw 52, and prevents the rotation of the support plate 32 by engaging with the tip of the ratchet craw 52.

Figure 4:
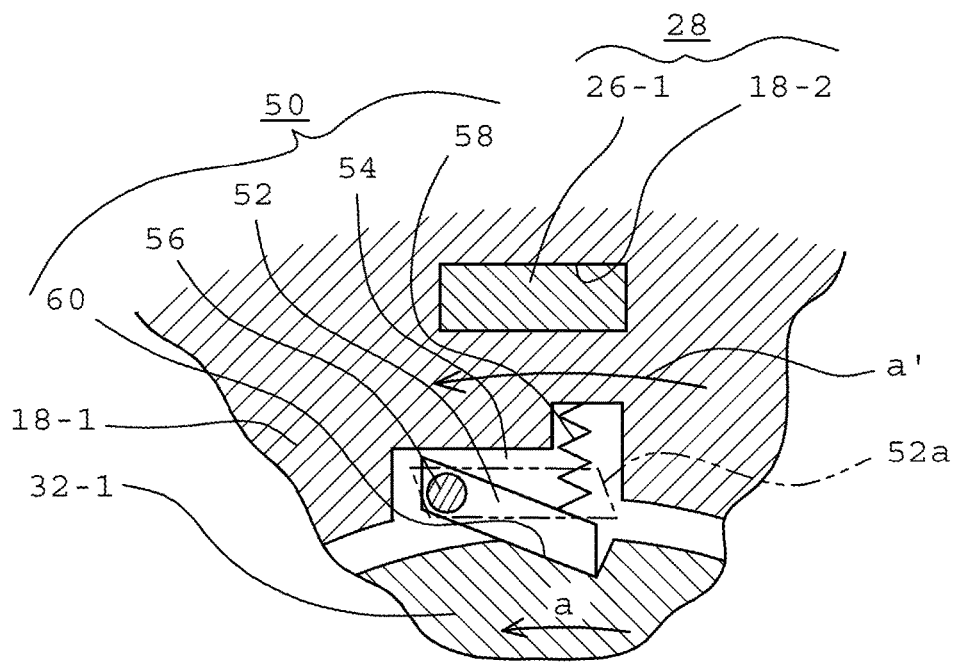
FIG. 4 is a partially enlarged view of FIG. 3 and enlargedly shows that a pair of the dog clutch and the friction clutch is in the engagement state.
Figure 7:
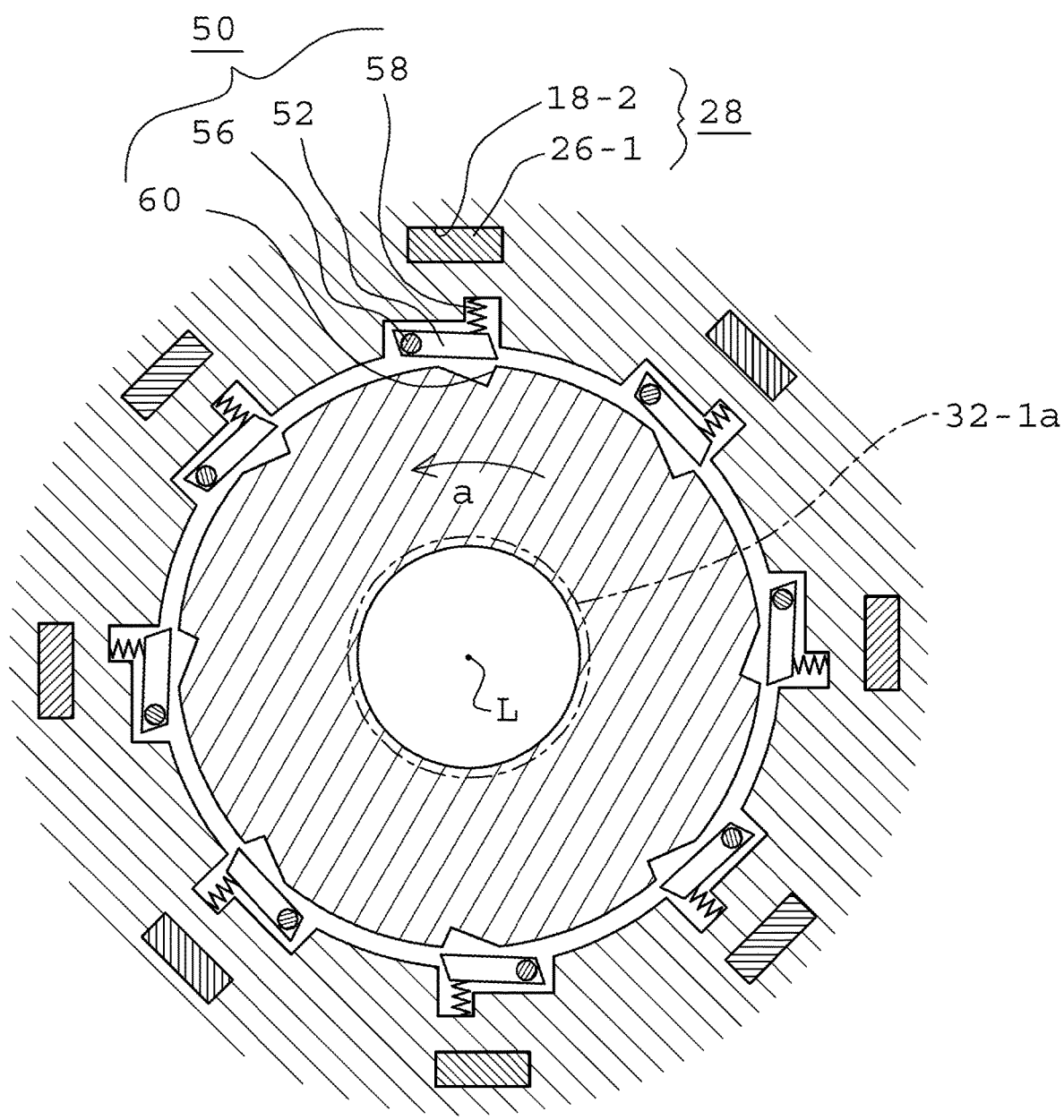
FIG. 7 is a cross-sectional view substantially taken along a III-III line in FIG. 2 as well as FIG. 3 and shows a state that the ratchet of the one-way clutch is released.

In the ratchet-type one-way clutch 50 of the first embodiment, when centrifugal force is smaller than the setting of the spring 58, as shown in FIGS. 3 and 4, the engagement with the ratchet craw 52 and the locking groove 60 becomes stronger against the clockwise rotation of the support plate 32 (the rotation has the same rotational direction as the rotational driving direction "a" of the support plate 32 by the rotation of the rotational axis of the electric motor 2). When the centrifugal force caused by the rotation is larger than the setting of the spring 58, as shown in FIG. 7, since the ratchet craw 52 pivots in an outward direction about the pin 56 against the spring 58 and the ratchet craw 52 is disengaged from the locking groove 60 shown in an imaginary line 52a of FIG. 4, the engagement of the ratchet craw 52 is released.

Figure 5:
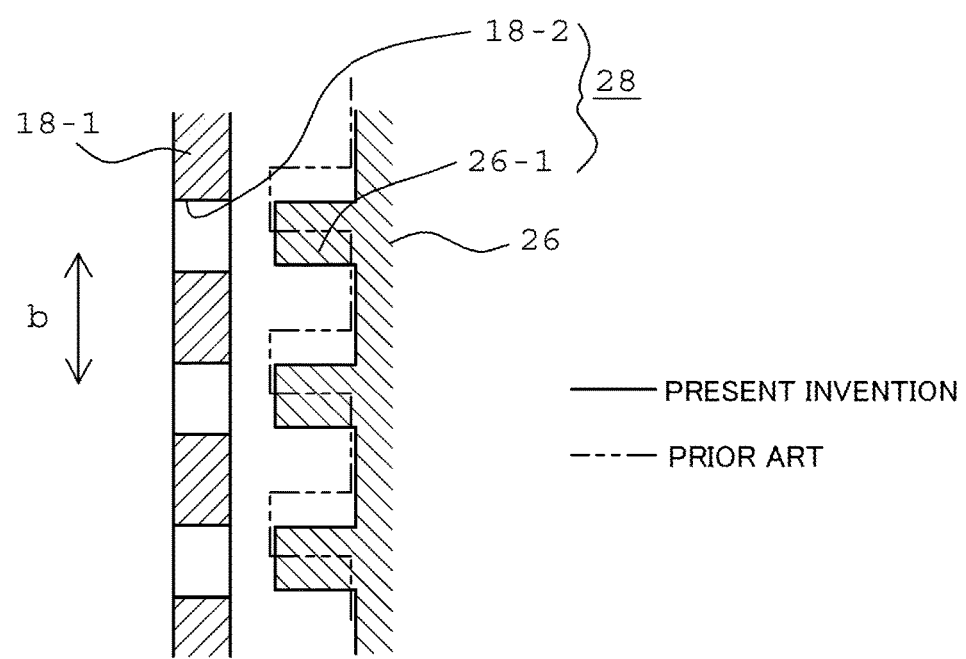
FIG. 5 is a schematic view showing a positon relationship between clutch claws and clutch grooves in a state that the dog clutch is the non-engagement state when a ratchet-type one-way clutch is the engagement state.

In the first embodiment, the dog clutch 28 includes eight clutch units including the clutch projection 26-1 and the clutch hole 18-2 in a circumferential direction, and the one-way clutch 50 includes the eight units including the ratchet craw 52, the spring 58, the locking groove and so on. In the present invention, the fastening operation and the non-fastening operation of the dog clutch 28 and those of the one-way clutch 50 are performed by the same rotational phase. As described below, the above operations lead to the shock reduction when shifting the two-stage transmission according to the first embodiment (speed reduction driving). That is, FIG. 5 schematically shows a relationship between the clutch projection 26-1 of the dog clutch 28 and the clutch hole 18-2 of the dog clutch 28 in a circumferential direction in the fastening state of the one-way clutch 50 (the fastening state against the locking groove 60 of the ratchet craw 52 shown in FIGS. 3 and 4). The respective clutch projections 26-1 and clutch holes 18-2 are held at the facing position in a circumferential direction.

In the first embodiment, the number of the units of both the dog clutch 28 and the one-way clutch 50 is eight. However, if the units of both the dog clutch 28 and the one-way clutch 50 would become the fastening state at the same rotational phase position, the number of the units of the dog clutch 28 could be different from the number of the units of the one-way clutch 50.

An operation of the two-stage transmission 4 according to the first embodiment will be described. In FIG. 2, the electromagnetic coil 31 is not energized, the armature 26 moves to the leftward position by elastic force of the return springs 45, and the dog clutch 28 becomes the fastening state and the multi-plate friction clutch 30 becomes the non-fastening state. Since the rotational driving force from the electric motor 2 for running is constrained to the housing 10 in which the ring gear 20 of the planetary gear mechanism 12 is fixed to the vehicle body, the rotation from the electric motor 2 is transferred to the sun gear 18 of the planetary gear mechanism 12 by the support plate 32 which is engaged by the rotational axis of the electric motor 2 and the spline groove 32-1*a* via the engagement portion (26-1 and 18-2) of the dog clutch 28. Because the ring gear 20 of the planetary gear mechanism 12 is fixed to the housing 10 of the vehicle body side, the rotational driving force in which the rotational speed is reduced to the rotation of the sun gear 18 having the reduction ratio depending on the gear numbers, is transferred to the carrier 16, and the output axis which is spline-fitted into the spline 16-1*a* by the rotation of the carrier 16 is rotated and is driven by the above rotational driving force. In this case, as is well known, when the gear number of the sun gear is set to "Zs" and the gear number of the ring gear is set to "Zr", the rotational ratio of the output axis (the carrier 16) to the input axis (the sun gear 18) is represented by "Zs/(Zs+Zr)", resulting in obtaining speed reduction. As described with respect to FIG. 1, the reduction ratio such as 2.4 can be set depending on the gear number.

In the fastening state of the dog clutch 28 (FIG. 2), since the inner race side of the one-way clutch 50 (the cylindrical extending portion 18-1 of the sun gear 18) and the outer race side of the one-way clutch 50 (the boss portion 32-1 of the support plate 32) rotate at the same rotational number, there is no difference between a case that the one-way clutch 50 is disposed and a case that the one-way clutch 50 is not disposed, with respect to the function of the power transmission. The spring force of the spring 58 is set to be larger than the centrifugal force in all of the first speed range. Because the centrifugal force generated in the ratchet craw 52 in the ratchet-type one-way clutch 50 is set to be smaller than the spring force of the spring 58, the fastening state shown in FIGS. 3 and 4 is maintained.

When the electromagnetic coil is energized for shifting from the first speed to the second speed, the magnetic flux generated in the electromagnetic coil 31 makes the armature move to the rightward direction in FIG. 2 against the elastic force of the return springs 45. In this time, the clutch projections 26-1 of the dog clutch 28 are completely disengaged from the clutch holes 18-2 of the cylindrical extending portion 18-1 (the sun gear 18), and the dog clutch 28 becomes the non-fastening state. The driven plates 34 and the driving plates 38 are sandwiched between the friction clutch driving portion 44 of the armature 26 and the receiving pressure plate 43 via the clutch facings 40, and the friction clutch 30 becomes the fastening state. The rotation from the electric motor 2 is transferred from the support plate 32 to the outer cylinder 33 and the carrier 16 via the driving plates 38, the clutch facings 40 and the driven plates 34. Therefore, the output axis which is spline-fit into the spline 16-1*a* is rotated and is driven by inputting the rotation of the carrier 16, and the output axis and the input axis rotate at the same rotational speed (the gear ratio is 1.0). That is, since the carrier 16 serves as the input axis and the output axis, the gear ratio which is equal to 1.0 is obtained. The sun gear 18 is rotated and is driven by the carrier 16 via the pinions 14, but the sun gear 18 is not directly involved in the transferring of the driving force between the input axis and the output axis. With respect to the one-way clutch 50, the spring force is larger than the centrifugal force in the low rotation side range which is partially overlapped with the first speed range. When the rotational number becomes faster and is over this range, the ratchet craw 52 moves to the outward position and rotates by the centrifugal force and the dog clutch 28 becomes the non-fastening state. When the transmission 4 is completely shifted to the second speed, the one-way clutch 50 is not functioned and thus there is no difference between a case that the one-way clutch 50 is disposed and a case that the one-way clutch 50 is not disposed.

In the first embodiment, when the vehicle runs at the low speed, the transmission 4 is driven at the reduction ratio (=2.4) of the first speed in FIG. 2. As described with respect to FIG. 1, in a case that the reduction ratio of the speed reducer 6 is set to be 3.41, the total reduction ratio becomes 8.18 (=2.4×3.41) and this value is almost the same as the total reduction ratio of the conventional apparatus. Accordingly, the high efficiency of the electric motor 2 in the normal driving range can be obtained. Because the dog clutch 28 becomes the fastening state by the elastic force of the return springs 45 and the electromagnetic coil 31 is not energized, the much higher energy efficiency can be obtained in the normal driving range. When the vehicle runs at the high speed, the electromagnetic coil 31 is energized, the dog clutch 28 becomes the non-fastening state and the multi-plate friction clutch 30 becomes the fastening state, the transmission 4 is shifted to the gear ratio of the second speed (=1.0), and the output axis and the input axis rotate at the same rotational speed, resulting in ensuring the high efficient driving state of the electric motor 2 in the high vehicle speed driving. That is, as described with respect to FIG. 1, the total reduction ratio is equal to 3.41 (=1.0×3.41) and the driving is performed by using the reduction ratio the speed reducer 6 (=3.41). Since the total reduction ratio in the high vehicle speed driving range is smaller than that in the low vehicle speed driving range, the electric motor 2 enables to be driven at the more efficient rotational range in which the rotational number is lower than that of the conventional apparatus, in the high vehicle speed driving range. Consequently, the high vehicle speed can be obtained with the high efficiency.

Next, the torque drop prevention operation when shifting between the low vehicle speed driving (the first speed) and the high vehicle speed driving (the second speed) will be described. Under operating the electromagnetic force of the electromagnetic coil 31 for shifting from the low vehicle speed driving to the high vehicle speed driving, the spring pressing portion 26-6 presses the return springs 45, the armature 26 moves to the rightward direction by elastic deformation of the return springs 45, the clutch craw 26-1 is disengaged from the corresponding clutch hole 18-2, and the dog clutch 28 becomes the non-fastening state. The above-described intermediate state that both the dog clutch 28 and the friction clutch 30 become the non-fastening state is instantaneously existed just after the dog clutch 28 switches to the non-fastening state. In this intermediate state, since the sun gear 18 (the cylindrical extending portion 18-1) is released from the driving power source (the electric motor rotational axis) and the driving torque is removed, the sun gear 18 (the cylindrical extending portion 18-1) is returned to the reversed direction of the arrow "a" direction of the electric motor rotational axis in FIG. 4 just when the dog clutch 28 becomes the non-fastening state. In this time, the ratchet craw 52 of the one-way clutch 50 is strutted to the sun gear 18 which returns to the reversed direction of the arrow "a" direction, the cylindrical portion 18-1 (the outer race of the one-way clutch 50) of the sun gear 18 is locked to the boss portion 32-1 (the inner race of the one-way clutch 50) of the support plate 32 which is always coupled with the electric motor rotational axis, and the rotation of the arrow "a" direction of the electric motor rotational axis is transmitted from the boss portion 32-1 of the support plate 32 to the boss portion 18-1 of the sun gear 18, that is, to the wheel side, resulting in not occurring the torque drop. By increasing the rotational number of the electric motor output axis after the friction clutch 30 is completely fastened, in a case that the rotational number of the sun gear 18, that is, the rotational number of the arrow "a'" direction (FIG. 4) of the cylindrical portion 18-3 is higher than that of the arrow "a" direction of the electric motor rotational axis, the ratchet craw 52 can climb over the locking groove 60 even when the centrifugal force is smaller than the spring force, and the sun gear 18 enables to increase the rotational number. Then, when the friction clutch 30 completely becomes the fastening state and the rotational number of the sun gear 18 becomes higher, as shown in the imaginary line 52a of FIG. 4 or FIG. 7, the ratchet craw 52 rotates around the pin 56 in a radial outward direction and is disengaged from the locking groove 60. When the ratchet craw 52 is disengaged from the locking groove 60 (when the one-way clutch 50 becomes the unlocked state), the relative rotation between the outer race (the cylindrical extending portion 18-1 of the sun gear 18) and the inner race (the boss portion 32-1 of the support plate 32) is occurred and then the rotational phase of the ratchet 52 to the locking groove 60 becomes uncertain.

The inverse operation is performed in the shifting process from the high vehicle speed driving (the second speed) to the low vehicle speed driving (the first speed). In the driving with the second speed, when the vehicle speed is decreased and then the centrifugal force becomes smaller than the setting force of the spring 58, the ratchet craw 52 of the one-way clutch 50 is engaged with the locking groove 60 under the bias force of the spring 58 by the relative rotation and the one-way clutch 50 becomes the fastening state. When the vehicle speed is further decreased and then the shifting condition from the high vehicle speed driving (the second speed) to the low vehicle speed driving (the first speed) is satisfied, the friction clutch 30 becomes the non-fastening state and the armature 26 is driven by the springs 45 such that the dog clutch 28 is to be engaged. In this time, the intermediate state that both the friction clutch 30 and the dog clutch 28 become the non-fastening state is instantaneously occurred. Since the ratchet craw 52 is engaged with the locking groove 60 in the one-way clutch 50, the sun gear 18 (the cylindrical extending portion 18-1) is locked to the input axis side, as well as a case of shifting from the first speed to the second speed, resulting in preventing the torque drop. Further, because the shifting from the high vehicle speed driving (the second speed) to the low vehicle speed driving (the first speed) is performed in a state that the ratchet-type one-way clutch 50 is engaged, as described with respect to FIG. 5, the rotational phase of the clutch projection 26-1 of the dog clutch 28 is coincident with that of the clutch hole 18-2 of the dog clutch 28 in shifting and the clutch projection 26-1 is instantaneously engaged with the clutch hole 18-2 just after the intermediate state that both the friction clutch 30 and the dog clutch 28 are in the non-fastening state is terminated. That is, in the general dog clutch, since the rotational phase of the clutch projection 26-1' (the imaginary line) is not always coincident with that of the clutch hole 18-2 when the dog clutch is switched to the fastening state, the waiting operation that both rotational phases are coincident is needed and then the speed reduction is occurred. In the present invention, since the relative rotation in which the clutch projection 26-1 meets the clutch hole 18-2 is not needed, the transmission shock in shifting from the high vehicle speed driving (the second speed) to the low vehicle speed driving (the first speed) can be reduced.

Figure 8:
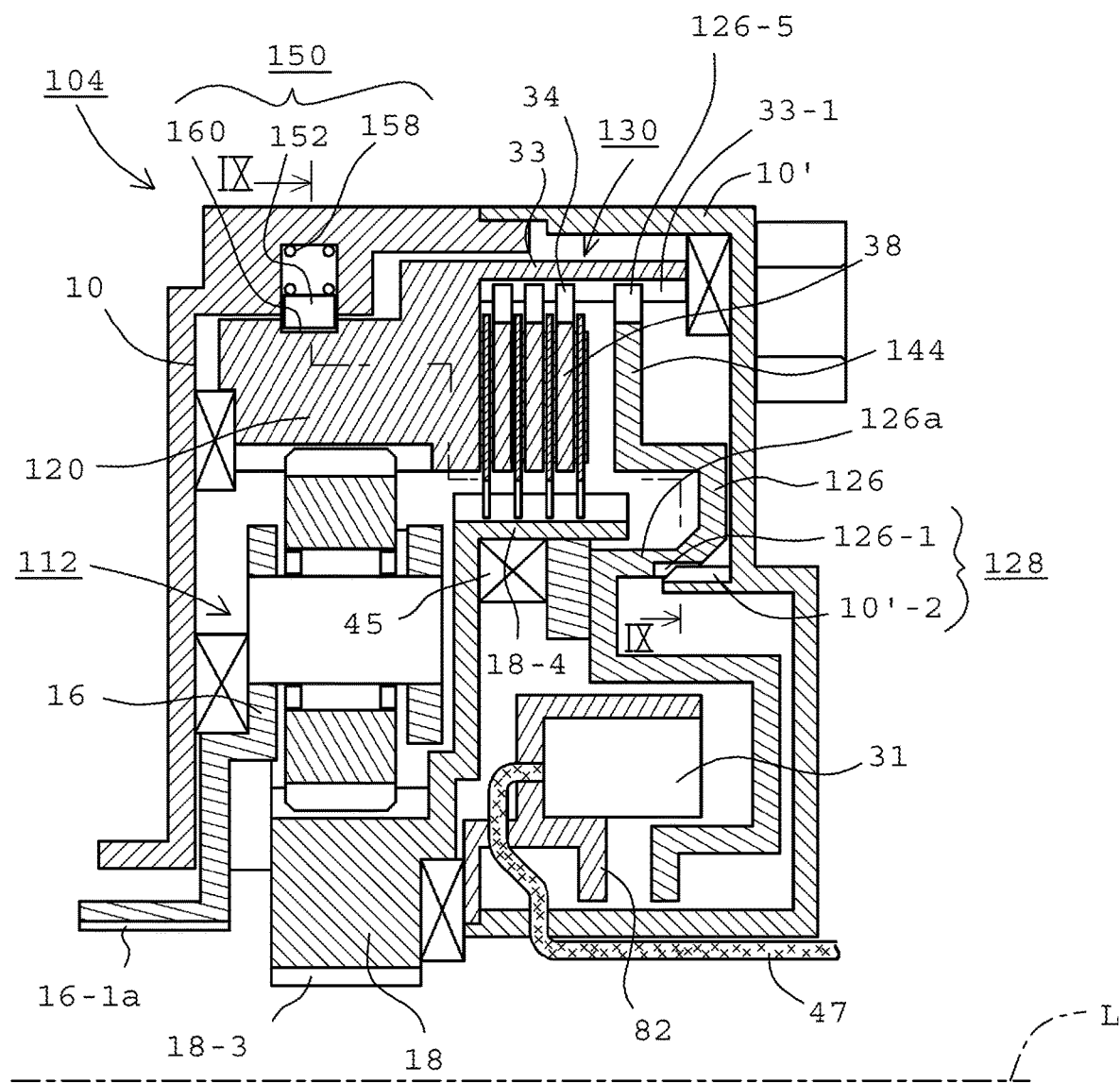
FIG. 8 is a cross-sectional view of the upper portion along the central axis of the two-stage transmission of the second embodiment according to the present invention and shows a state that the dog clutch is the engagement state and the friction clutch is the non-engagement state.
Figure 9:
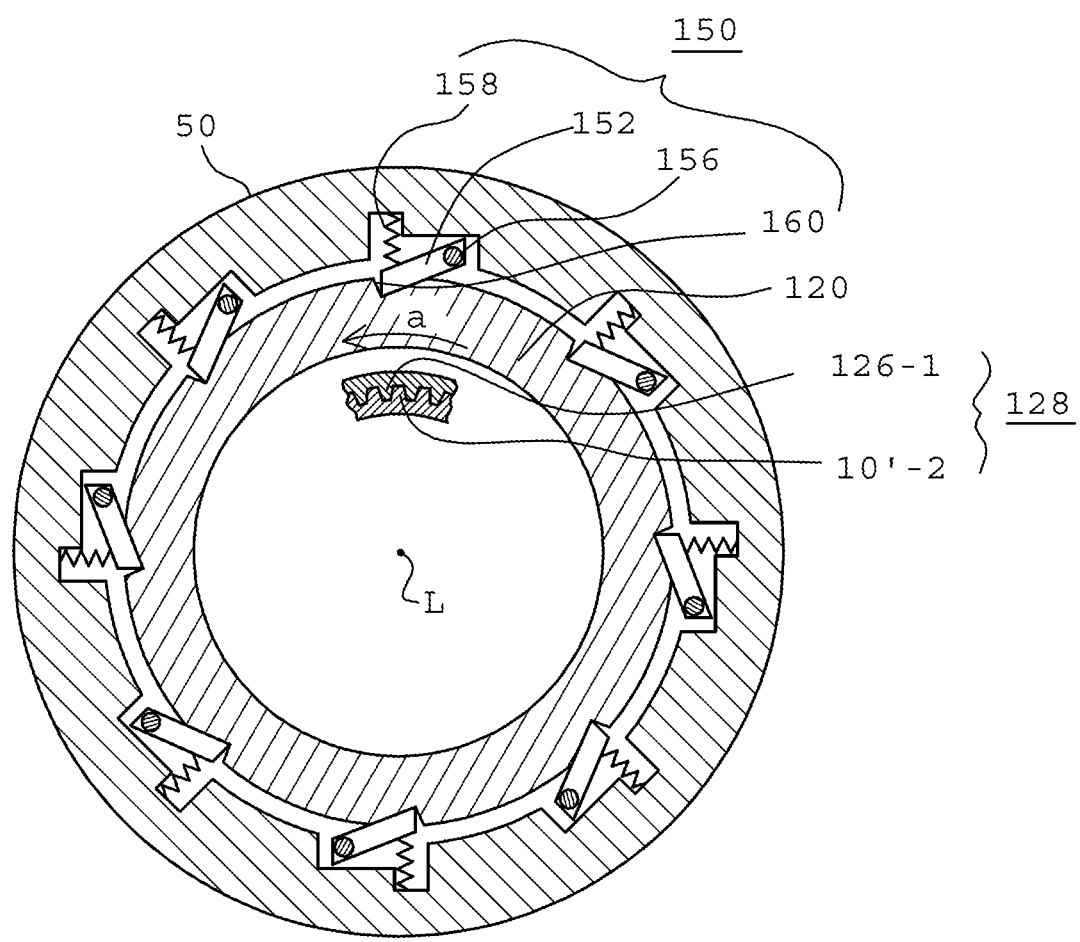
FIG. 9 is a cross-sectional view substantially taken along a IX-IX line in FIG. 8.
Figure 10:
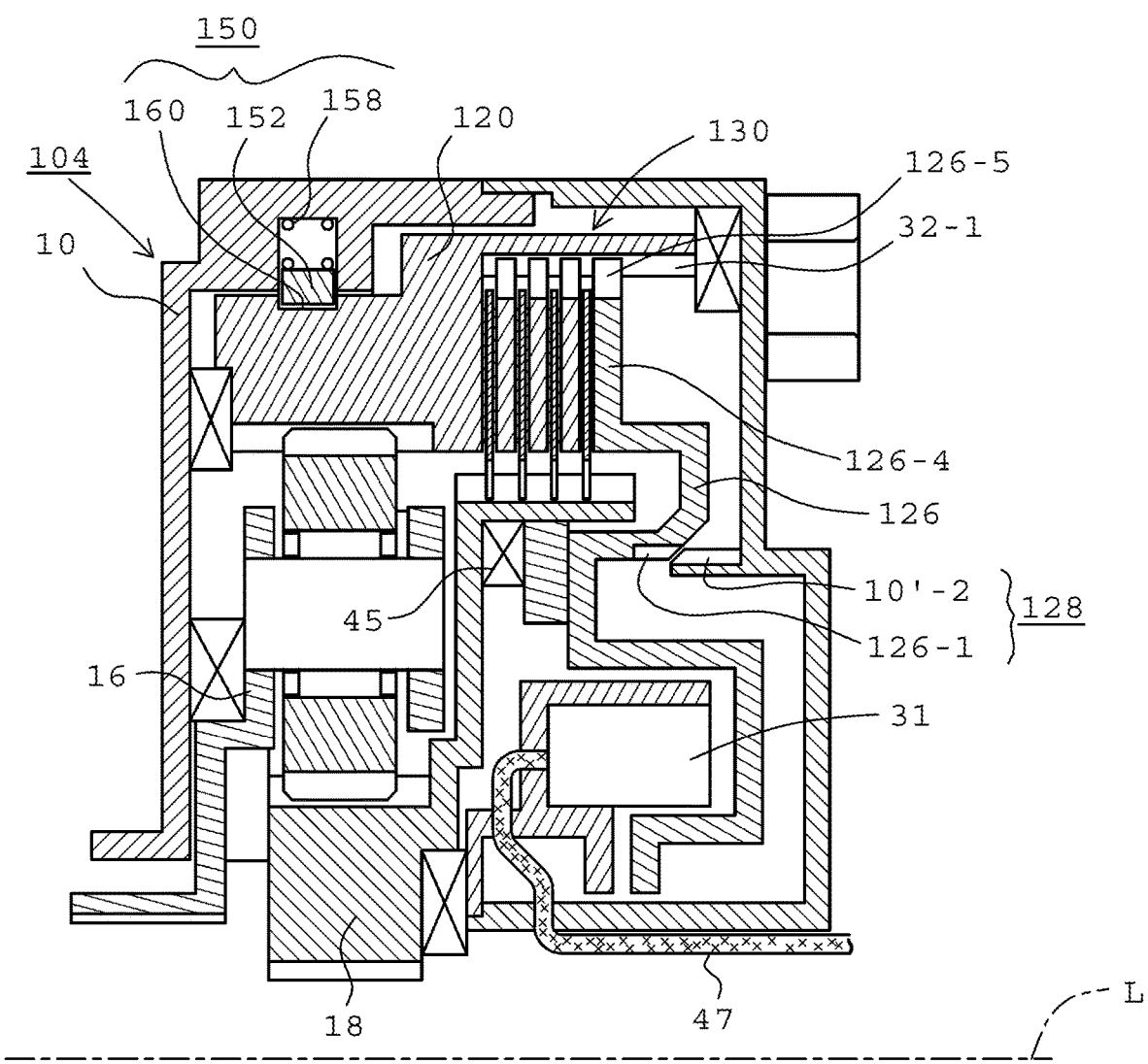
FIG. 10 is a cross-sectional view of the upper portion along the central axis of the two-stage transmission of the second embodiment according to the present invention as well as FIG. 8, and shows a state that the dog clutch is the non-engagement state and the friction clutch is the engagement state.

FIGS. 8, 9 and 10 show the two-stage transmission 104 of the second embodiment according to the present invention, in which the countermeasure against the torque drop occurring in shifting between the low vehicle speed driving and the high vehicle speed driving is implemented. In the two-stage transmission 104 of the second embodiment, the ring gear 120 of the planetary gear mechanism 112 not only is rotatable to the housing 10, but also is selectively fixed to the housing 10 by the one-way clutch 150. As well as the first embodiment shown in FIGS. 2 to 7, the low vehicle speed driving is performed by the speed reduction driving in which the ring gear is fixed and the gear ratio is 2.4, and the high vehicle speed driving is performed by the uniform speed driving in which the sun gear 18 integrally rotates with the ring gear 120 and the gear ratio is 1.0.

The configuration of the two-stage transmission 104 of the second embodiment (FIGS. 8, 9 and 10) will be described. The armature 126 includes the cylindrical portion 126a at the intermediate position in a radial direction, the cylindrical portion 126a includes an inner tooth 126-1 in a circumferential direction, an outer tooth 10'-2 in a circumferential direction is formed on the cover 10' which is fixed to the housing 10, and the dog clutch 128 is constituted by the inner tooth 126-1 and the outer tooth 10'-2. The driving portion 144 of the friction clutch 130 is constituted by the outer portion of the armature 126, the outer tooth 126-5 is formed on the outer circumference of the armature 126 and pivotably engages with the sliding groove 33-1 of the inner cylinder 33 in an axial direction. For assembling the electromagnetic coil 31 to the two-stage transmission 104, an electromagnet holding frame 82 is fixed to the cover 10'. The inner spline 18-3 of the sun gear 18 is spline-fit into the electric motor rotational axis (not shown) and the rotation driving force by the electric motor 2 is transferred to the sun gear 18. The rear-end cylindrical portion 18-4 of the sun gear 18 is the inner cylinder of the friction clutch 130 in the second embodiment and the driving plates 38 are disposed in the inner cylinder of the friction clutch 130. As well as the first embodiment, the carrier 16 is spline-fit into the output axis of the wheel side by the inner spline 16-1a.

In the second embodiment, the ratchet-type one-way clutch 150 for preventing the torque drop in speed shifting between the first speed and the second speed is disposed between the ring gear 120 (in a schematic view of FIG. 8, the ring gear 120 serves as the inner race of the one-way clutch 150) and the housing 10 (in a schematic view of FIG. 8, the housing 10 serves as the outer race of the one-way clutch 150). As partially shown in FIG. 9, the assembled direction of the ratchet craw 152 of the one-way clutch 150 of the second embodiment is reversed to that of the first embodiment. Under the force of the spring 158, the ratchet craw 152 is strutted to the inner race (the ring gear 120) whose rotational direction is reversed to the counterclockwise rotational direction "a" of the driving axis. As well as FIG. 4, the spring 158 which rotates around the pin 156 and biases toward the locking groove 160 is disposed at the outer race.

In the second embodiment, since the spring 158 is attached to (is fixed to) the housing 10, the centrifugal force is not operated to the spring 158.

An operation of the second embodiment will be described. In the low vehicle speed driving, the electromagnetic coil 31 is not energized, the armature 126 is pressed toward the cover 10' in FIG. 8 by the springs 45, the inner tooth 126-1 of the armature 126 is engaged with the outer tooth 10'-2 of the cover 10', the dog clutch 128 is the fastening state (the friction clutch 130 is the non-fastening state), and then the armature 126 is fixed. The outer tooth 126-5 formed on the outer circumferential edge of the armature 126 is engaged with the outer cylinder 33 of the friction clutch 130 via the sliding groove 33-1 and therefore the ring gear 120 is fixed to the cover 10', that is, the housing 10. The rotation of the electric motor rotational axis is transferred to the carrier 16, the gear ratio is 2.4 as well as the first embodiment, the rotational speed of the carrier 16 is reduced and both the inner race side (120) and the outer race side (10) of the one-way clutch 150 are still fixed. Considering the function, there is no difference between a case that the one-way clutch 150 is disposed and a case that the one-way clutch 150 is not disposed. Since the one-way clutch 150 is attached to (is fixed to) the housing 10 side, the centrifugal force is not operated to the spring 158. The spring 158 functions only to engage with the locking groove 160 and thus the spring force of the spring 158 may be very small.

In the high vehicle speed driving, the electromagnetic coil 31 is energized, as shown in FIG. 10, the armature 126 moves to the leftward direction by the electromagnetic force against the springs 45, the engagement between the inner tooth 126-1 of the armature 126 and the outer tooth 10'-2 of the cover 10' is released and the dog clutch 128 becomes the non-fastening state. On the other hand, by moving the armature 126 to the leftward direction, the clutch pack is sandwiched between the friction clutch driving portion 144 and the facing surface of the ring gear 120 and then the friction clutch 130 becomes the fastening state. Thereby, the ring gear 120 and the sun gear 18 are integrated by the friction clutch 130. The carrier 16, the ring gear 120 and the sun gear 18 integrally rotate and the rotation of the input side is transferred to the output side on one-to-one basis. In FIG. 9, the ring gear 120 rotates over the ratchet craw 152 at the locking groove 160 against the spring 158. However, since the spring force of the spring 158 is very small, rotational resistance by the friction is substantially omitted.

In shifting from the low vehicle speed driving (FIG. 8) to the high vehicle speed driving (FIG. 10), a state that the dog clutch 128 is the non-fastening state and the friction clutch 130 is not completely the fastening state can instantaneously be occurred. In this time, the ring gear 120 becomes a free state and returns to the reversed direction (the direction in which the torque drop is occurred) against the rotational direction "a" (FIG. 9) of the rotational axis of the electric motor 2. However, the ratchet craw 152 of the one-way clutch 150 functions to lock such a movement, that is, the locking against the housing 10 of the ring gear 120 is continued, the rotation of the rotational axis of the electric motor 2 is transferred to the wheel side via the sun gear 18 and the carrier 16, resulting in preventing the torque drop. When the friction clutch 130 is completely the fastening state, the rotation of the ring gear 120 is transferred to the wheel side with the same rotation direction as that of the rotational axis of the electric motor 2 (the arrow "a") and the gear ratio whose value is 1.0. Since this rotational direction is the direction in which the ring gear 120 rotates over the locking groove 160 of the ratchet craw 152, the rotation of the ring gear 120 remains robust.

In shifting from the high vehicle speed driving (FIG. 10) to the low vehicle speed driving (FIG. 8), a state that the friction clutch 130 is the non-fastening state and the dog clutch 128 is not completely the fastening state can instantaneously be occurred and then the torque drop state that the output is not instantaneously constrained to the input may be occurred. In this time, since the ratchet craw 152 of the one-way clutch 150 serves as the strut and the ring gear 120 is locked, the input side rotation of the electric motor 2 can be transferred to the wheels of the output side until the dog clutch 128 becomes the fastening state. As described with respect to FIG. 5 of the first embodiment, because the rotational phase of the one-way clutch 150 is coincident with that of the dog clutch 128, the dog clutch 128 is instantaneously engaged without the position movement in which the dog clutch 150 can be engaged, and the transmission shock is efficiently reduced. That is, as shown in FIG. 9, since the rotational phase of the inner tooth 126-1 of the dog clutch 128 is coincident with that of the outer tooth 10'-2 of the dog clutch 128 in the engagement of the one-way clutch 150, both the rotational phase of the inner tooth 126-1 and that of the outer tooth 10'-2 are coincident even in shifting from the high vehicle speed driving (FIG. 10) to the low vehicle speed driving (FIG. 8), the relative rotation operation for the phase adjustment is not needed, the dog clutch 128 instantaneously becomes the fastening state and the reduction effect in the transmission shock is obtained as well as the configuration of the first embodiment.

As described in herein, the gear ratio in the planetary gear mechanism is explained in the embodiments that the speed reduction (the first speed) in which the ring gear is fixed and the relatively speed increase (the second speed) in which the three rotational elements integrally rotate are realized. As is well known in those skilled in the art, by using the speed reducer (FIG. 1) having the large reduction ratio, the modified configuration that the relative speed reduction (the first speed) in which the three rotational elements of the planetary gear mechanism integrally rotate and the speed increase (the second speed) in which the sun gear is fixed are realized, can easily be conceived, and it is obvious for those skilled in the art that the above configuration is also included in the present invention. The two-stage transmission according to the present invention can be adapted to not only the electric vehicle (EV) but also the hybrid vehicle.

EXPLANATION OF REFERENCE NUMERALS 2 electric motor for running
4, 104 two-stage transmission
6 speed reducer
10 housing
12, 112 planetary gear mechanism
14 pinion
16 carrier
18-2 clutch hole
20, 120 ring gear
26, 126 armature
26-1 clutch projection
28, 128 dog clutch
30, 130 friction clutch
34 driven plate
38 driving plate
40 clutch facing
43 pressure receiving plate
44, 144 friction clutch driving portion 46 electromagnetic coil
50, 150 one-way clutch
52, 152 ratchet craw
56, 156 pin
60, 160 locking groove

The invention claimed is:

1. A two-stage transmission that is disposed along an output axis of an electric motor in a vehicle using said electric motor for wheel driving, comprising:

a planetary gear mechanism which comprises three rotational elements including a carrier pivotally supporting plural pinions and plural gears which have a different tooth number and engage with said pinions, and uses a first speed mode in which a first rotational element selected from said three rotational elements is fixed to a housing side and power transmission is performed by using a gear ratio whose value is different from 1.0 and which is obtained between a second rotational element and a third rotational element, and a second speed mode in which said power transmission is performed by using said gear ratio whose value is 1.0 and which is obtained by fixing said first rotational element to a housing side and inputting from and outputting to one of said second rotational element and said third rotational element, or by not fixing said first rotational element to said housing side and integrally rotating one of said second rotational element and said third rotational element with said first rotational element;

a dog clutch which couples with said rotational elements of said planetary gear mechanism to select a relatively low gear ratio side speed mode between said first speed mode and said second speed mode;

a friction clutch which couples with said rotational elements of said planetary gear mechanism to select a relatively high gear ratio side speed mode between said first speed mode and said second speed mode; and a ratchet-type one-way clutch to prevent a torque drop when shifting between said first speed mode and said second speed mode, wherein engagement portions of said dog clutch and a ratchet engagement portions of said ratchet-type one-way clutch are arranged at the same rotational phase position.

2. The two-stage transmission for the electrically driven vehicle according to claim 1, wherein said first rotational element selected from said three rotational elements of said planetary gear mechanism is permanently fixed to said housing side, wherein said first speed mode in which a reduction speed side gear ratio whose value is larger than 1.0 is obtained between said second rotational element and said third rotational element by using said dog clutch, serves as said relatively low gear ratio side speed mode, wherein said second speed mode in which a gear ratio whose value is 1.0 is obtained by inputting from and outputting to one of said second rotational element and said third rotational element of said planetary gear mechanism by using said friction clutch, serves as said relatively high gear ratio side speed mode, and wherein, when shifting between said first speed mode and said second speed mode, said one-way clutch prevents said torque drop by locking said second rotational element or said third rotational element to an input axis side such that transmitting rotation is surely performed.

3. The two-stage transmission for the electrically driven vehicle according to claim 1, wherein said first rotational element selected from said three rotational elements of said planetary gear mechanism is selectively fixed to said housing side, wherein said first speed mode in which said first rotational element is fixed to said housing side and a gear ratio whose value is larger than 1.0 and which becomes a reduction speed side gear ratio is obtained between said second rotational element and said third rotational element by using said dog clutch, serves as said relatively low gear ratio side speed mode, wherein said second speed mode in which said first rotational element is released from said fixing to said housing side and a gear ratio whose value is 1.0 is obtained by integrally rotating one of said second rotational element and said third rotational element with said first rotational element by using said friction clutch, serves as said relatively high gear ratio side speed mode, and wherein said one-way clutch prevents said torque drop by locking said first rotational element to said housing side such that power transmission from an input side to an output side is surely performed.

* * * * *